UNITED STATES PATENT OFFICE.

GROVER C. WATSON, OF MINERAL WELLS, TEXAS.

PAINT.

1,347,311. Specification of Letters Patent. Patented July 20, 1920.

No Drawing. Application filed October 13, 1919. Serial No. 330,378.

*To all whom it may concern:*

Be it known that I, GROVER C. WATSON, a citizen of the United States of America, residing at Mineral Wells, in the county of Palo Pinto and State of Texas, have invented certain new and useful Improvements in Paints, of which the following is a specification.

My invention relates to paints and more particularly to paints for roofs and barns; and the object is to provide paints which will be highly efficient in preserving the material of buildings and in preventing deterioration of the building material, and also in preventing leaks in roofs. Another object is to provide paints at relatively small cost and which can be made of materials which can be bought at small cost and in great quantities. Other objects and advantages will be fully explained in the following description and the invention will be more particularly pointed out in the claims.

The paint is made of crude oil or petroleum and gloss oil and an assorted or selected mineral according to the color required.

For making paint in fifty gallon lots: Use forty-two gallons of crude oil or petroleum, five gallons of gloss oil or a low grade varnish, and one-hundred pounds of green mineral for making green paints. These materials are mixed and thoroughly stirred while cold to make the paint ready for use.

For making red paint in fifty gallon lots: Use forty-two gallons of crude oil or petroleum, five gallons of gloss oil, and one-hundred and fifty pounds of red mineral. Mix all together and stir thoroughly while cold or at any other reasonable temperature to prepare the paint ready for use.

For making a brown paint: Use forty-four gallons of crude oil or petroleum, five gallons of gloss oil, and fifteen pounds of burnt umber. Mix all these materials together and stir thoroughly to prepare the paint for use.

These paints are to be used as other paints and have been demonstrated in actual service conditions to be highly efficient for the purposes stated.

Any quantity of paint may be made by mixing the ingredients in the proportions above stated.

What I claim is,—

1. A paint for industrial purposes composed of crude oil or petroleum, gloss oil, and a mineral for making paints.

2. A paint for industrial purposes composed of crude oil or petroleum for the principal vehicle, gloss oil for making a smooth finish, and a mineral for making paints for giving the required color.

3. A paint for industrial purposes in fifty gallon quantities composed of forty-two gallons of crude oil or petroleum, five gallons of gloss oil, and one hundred pounds of green mineral for making green paint.

In testimony whereof I set my hand this 10th day of October, A. D. 1919.

GROVER C. WATSON.